United States Patent [19]

Gautsch

[11] Patent Number: 5,223,225

[45] Date of Patent: Jun. 29, 1993

[54] SCALE-MARKED PIPET TIP FOR PRECISION DISPENSING OF FLUIDS OVER A LARGE RANGE OF VOLUMES

[75] Inventor: Jim Gautsch, Solama Beach, Calif.

[73] Assignee: BIO 101, La Jolla, Calif.

[21] Appl. No.: 701,787

[22] Filed: May 17, 1991

[51] Int. Cl.$^5$ .............................................. G01N 1/10
[52] U.S. Cl. .................................... 422/100; 436/180; 73/864.02; 73/864.61; 73/866.3
[58] Field of Search ........................ 422/100; 436/180; 73/864.02, 864.61, 427, 866.3

[56] References Cited

U.S. PATENT DOCUMENTS

| | | | |
|---|---|---|---|
| 3,500,689 | 3/1970 | Band | 73/864.02 |
| 3,864,979 | 2/1975 | Ayres | 422/100 |
| 3,891,392 | 6/1975 | Betts et al. | 436/180 |
| 4,267,729 | 5/1981 | Eddelman et al. | 73/864.11 |

FOREIGN PATENT DOCUMENTS 0953196 11/1956 Fed. Rep. of Germany ... 73/864.14

Primary Examiner—Lynn M. Kummert
Attorney, Agent, or Firm—Thomas Fitting

[57] ABSTRACT

An improved "reference" pipet tip supports a number of volume scale ranges on its external body—preferably a scale for each of small volumes 0.5 microliters through 5 microliters, medium volumes 5 microliters to 50 microliters, and large volumes of 50, 100, and 150 microliters—because the geometry of its interior reservoir is non-uniform. In particular, the pipet tip's interior reservoir increases in diameter, and in contained volume, at a first rate, and in response to a first conical angle of rotation, at its distal end, tip, region. The interior reservoir increases at a different, larger, rate at its proximal end region, which proximal end region is connected to a pipettor. Fluid volumes in a broad range from. 0.5 microliters to 150 microliters are typically measurable at accuracies of better than 10%.

5 Claims, 4 Drawing Sheets

| TABULATION BLOCK | | | |
|---|---|---|---|
| DIM SYMBOL | ID ±.0003 | OD ±.002 | DIM FROM 0.00 DATUM |
| A | .0120 | .036 | .000 |
| B | | .044 | .185 |
| C | | .051 | .300 |
| D | | .058 | .461 |
| E | | .065 | .579 |
| F | | .072 | .675 |
| G | | .079 | .757 |
| H | .0397 | .087 | 1.060 |
| I | | .139 | 1.648 |
| J | | .168 | 1.934 |
| K | | .189 | 2.127 |
| L | .2110 | .271 | 2.700 |
| | | | |

SCALE-MARKED PIPET TIP FOR PRECISION DISPENSING OF FLUIDS OVER A LARGE RANGE OF VOLUMES

BACKGROUND OF THE INVENTION

Field of the Invention

The present invention generally concerns a pipet tip that fits on a pipettor for the dispensing of a fluid, and more particularly concerns a pipet tip having reference scale markings. The present invention still more particularly concerns a relationship between (i) locations at which reference scale markings are placed on the exterior of a pipet tip and (ii) a construction of the interior reservoir of the pipet tip.

Background of the Invention

A pipet tip is a low cost, disposable, item of laboratory equipment that fits by friction upon one end of a pipettor. The elongate pipet tip is typically molded from plastic with a conically- or frustaconically-shaped interior reservoir and with an exterior in the rough shape of a cone. The distal end of the pipet tip presents a small circular orifice that is centered about the longitudinal axis of the pipet tip. The exterior surface of the pipet tip's proximal end region typically presents a circumferential ridge, or shoulder, and/or one or more longitudinal ribs. The shoulder and ribs facilitate holding the pipet tip between the fingers during the act of mounting it to, or dismounting it from, a pipettor at its proximal end.

The pipet tip fits to a pipettor for purposes of dispensing fluid from, or drawing fluid into, its central reservoir. Fluid is drawn into, or expelled from, the central reservoir of the pipette tip through its distal end opening under respective negative (suction) or positive pressure forces that are provided to the proximal end of the pipet tip by, and from, the pipettor.

The pipet tip is replaceable to the pipettor so as to avoid any transfer of chemical or biological contamination between those exterior reservoirs, or cultures, of various fluids and slurries into which the distal end of the pipette tip is immersed, and between which it transfers fluid(s). Pipet tips are optionally delivered into use in sterile condition, and may be sterilized in an autoclave for reuse.

Sometimes many pipet tips may be arrayed in a line, or in a grid, for performing fluid dispensing or withdrawal operations from many separate external fluid sources or sinks in parallel, and all at the same time. A multi-channel pipettor may typically be fitted with such an array of pipet tips in a one-step operation by use of a jig, or rack. In such operation the pipet tips are first hand- or machine-loaded into the jig. The pipette tips may be aided in being maintained properly aligned within the jig by their exterior ribs or shoulder(s). Finally, the multi-channel pipettor is forced into fluid-tight contact with all the pipet tips. The arrayed pipet tips are also subject to various fluid delivery, fluid withdrawal, and/or racking operations during operational use. Various of these operations may be aided by corresponding variations in the constructions of the pipet tips.

Of particular pertinence to the present invention, experimenters have found it useful to attempt to quantatively gauge the volume of the liquid contents which are (i) contained within, or (ii) dispensed from, the pipet tip's interior reservoir. In order to do so, the experimenters make a visual reference, through the transparent or translucent walls of the pipet tip, between the fluid level that is within the interior reservoir of the pipet tip and a scale that is emplaced on the exterior of the pipet tip. Such a pipet tip having an external scale is commonly called a "reference" pipet tip.

For reasons of cost, simplicity, and suitability to the fluid transfer function of the pipet tip, the scale of a "reference" pipet tip has commonly been molded into the tip's exterior surface. One such pipet tip presenting a molded scale is manufactured by Utah Manufacturing, Inc. under the "Statatip" trademark. Another such pipet tip with an integral scale is described, circa 1991, as the "new reference pipet tip" of Elkay Products, Inc., 800 Boston Turnpike, Shrewsbury, MA 01545, U.S.A. This later pipet tip is stated to be compatible with the Titertek® (registered trademark of Flow Laboratories, Inc.), Pipetman® (registered trademark of Gilson Medical Electronics), and Finnpipette® (registered trademark of Labsystems, Inc.) pipettors.

The previous attempts to provide a useful scale on a "reference" pipet tip have suffered from (i) a lack of measurement accuracy at the lowest volumes, typically 0.5 microliter to 5 microliters—at which small fluid volumes measurements are commonly of interest—and (ii) a lack of useful range, such as would permit the measurement of fluid volumes ranging from 1 microliter to 50 microliters and more. The accuracy and range problems are based in the geometries of the previous pipet tip, and of its contained reservoir. If the exterior scale markings of the pipet tip (i) are to reflect minute differences in contained fluid volumes, on the order of 1 microliter from one scale marking to the next, and (ii) are also to be a such reasonable distance of separation one to the next as may readily be discerned by the unaided human eye (on the order of greater than 2 millimeters separation from marking to marking), then the interior reservoir of the pipet must be, at least in the region of such a scale, extremely narrow. This is indeed the case: pipet tips that permit the accurate measurement of small fluid volumes are typically elongated and have, of necessity, a "needle-thin" interior channel.

The requirement that the separation of the markings on the external scale of a "reference" pipet tip should reflect the incremental volumes of the internal reservoir of the same pipet tip is not, in of itself, inimical to the usefulness of having such a scale upon a pipet tip. Indeed, "reference" pipet tips conveniently provide a quantitative scale at no, or at an insignificant, increment of cost over pipet tips not possessing such a scale. "Reference" pipet tips are, for this reason, superior.

However, a problem arises when a user of a "reference" pipet tip would, at one time, like to measure a fluid volume of, for example, 1 microliter ±0.1 microliter (±10%) and, at another time, a much larger fluid volume of, for example, 50 microliter ±5 microliter (again ±10%). The same pipet tip scale that admirably serves in a one region of volumes will be truncated, and inoperative, before extending so far as another region of volumes that differ by a order of magnitude or more (in either direction—greater or lessor).

In response to this quite ordinary limitation—which limitation is seemingly intractably rooted in the very essence of the physical construction of a device so extremely simple as is a "reference" pipet tip—some manufacturers of pipet tips have seized upon an obvious compromise. The scale on the pipet tip is caused to serve an intermediate range of volumes, typically from roughly 5-10 microliters to roughly 25-50 microliters in increments of typically 5 or 10 microliters per scale division. Either smaller, or larger, fluid volumes than those volume that appear upon the scale are effectively not measurable.

Alas, it is very commonly demanded in the chemical and life sciences to accurately measure, at different times, both (i) a very small amount of liquid, on the order of 1 microliter or less, and also (ii) a much larger volume, on the order of 50 or 100 microliters or more. Sometimes the relatively smaller and relatively larger volume measurements are even of the same fluid. The reason for this requirement is simple: sometimes a large amount of fluid is to be distributed in small increments.

According to the desire to accurately (e.g., ±10%) dispense fluids over broad ranges of volumes (e.g., over one and more preferably two orders of magnitude) by use of a "reference" pipet tip, it would be useful if an inexpensive pipet tip could somehow dispense both small and large volumes of fluid at reasonable accuracies by direct visual reference to a scale upon such pipet tip.

SUMMARY OF THE INVENTION

The present invention contemplates an improved "reference" pipet tip simultaneously supporting a number of volume scale ranges on its external body—preferably a scale for each of small volumes, medium volumes, and large volumes—because the geometry of the interior reservoir of the pipet tip is non-uniform. The non-uniform geometry of the "reference" pipet tip's interior reservoir permits that all the scales may simultaneously be correct, and accurate for the measurement of associated fluid volumes. Such an improved "reference" pipet tip may, for example, accurately, on the order of 10%, dispense volumes of fluid ranging from 0.5 microliter to 150 microliters—a range of over two orders of magnitude. This measurement accuracy, and range, is realized in a device typically costing less than 5 cents U.S.

The present invention constitutes an improvement to a standard "reference" pipet tip having (i) a generally conically-shaped transparent housing with a central axis, (ii) a generally conically-shaped interior reservoir to the housing, and (iii) a generally central aperture at the housing's distal tip end through which aperture liquid contents of the interior reservoir may be discharged. The proximal end of the conical housing engages a pipettor in a conventional manner. In the manner of existing "reference" pipet tips, the housing includes a visual scale on the exterior of the housing, which scale has a number of space-apart scale markings. The fluid contents of the housing's interior reservoir may be viewed through the transparent housing for comparison to the housing's exterior scale markings.

In accordance with the present invention, the lineal separation of the housing's visual scale markings one to the next varies, if at all, in a ratio that is less than 125% (1.25:1). Moreover, the lineal separation between any two pairs of the housing's overall visual scale markings varies, if at all, in a ratio that is less than 500% (5:1). These maximum ratios simply mean that the visual scale of the improved "reference" pipet tip is, if not precisely linear from one scale marking to the next, at least roughly linear. In other words, successive scale markings are at least roughly equidistantly separated. In other words, the housing's visual scales are thus completely normal—precisely what any user would expect and could conveniently interpret.

Meanwhile, the interior reservoir to the housing has and presents, in its extension from the housing's distal end aperture to its proximal end bore, regions that are possessed of non-uniform, and differing, conical angles of rotation, one region to the next. This is unlike previous "reference" pipet tips that have a conically-shaped interior reservoir having one, constant, conical angle of rotation. This differing conical angle between regions causes that the incremental volume (delta V) of each such region with changing linear distance along the housing's axis (delta d) is not in a constant ratio, region to region. In fact, the differing incremental volume with equal lineal distance along the housing's axis, is, from region to region, correlated with the visual scale markings that are upon the exterior of the housing.

This sophisticated correlation between internal volume and external scale markings of the pipet tip is to the end that—as between the differing conical angles of the regions of the housing's reservoir, and the visual scale markings that are upon the exterior of the housing—the volume contained within the housing's interior reservoir will vary, between some one pair of successive scale markings and some other pair of successive scale markings, by greater than 10,000% ($\times$100). This is the case regardless that the lineal distance between said pairs of scale markings is, as aforesaid, in a ratio not greater than 500% ($\times$5). In actual fact, the preferred embodiment of a pipet tip in accordance with the present invention presents scale markings that (i) encompass this broad range of volumes while (ii) being spaced apart with only but a slight irregularity, and quite logically.

Within a first—fine—scale region, that progression of incremental volume within the housing's reservoir which occurs between successive markings upon the scale is preferably in at least some ones of the sequence $(n)a$, $(n+1)a$, $(n+2)a$, $(n+3)a$, where n is an integer greater than or equal to one, and where a is a unit of volume.

Within a second—coarse—scale region, that progression of incremental volume within the housing's reservoir which occurs between successive markings upon the scale is in at least some ones of the sequence $(n)b$, $(2n)b$, $(3n)b$, where n is an integer greater than or equal to one, and where b is a unit of volume.

The improved "reference" pipet tip of the present invention may be regarded in an alternative manner by considering the volume of its reservoir to be the independent variable, as opposed to its external scale markings. So regarded, the housing's reservoir's volume unit "b" corresponding to successive markings upon the coarse region of the scale is at least five times the housing's volume unit "a" corresponding to successive markings in the fine region of the scale. This means $b \geq 5a$. This means that the volume difference between any number "n" of coarse scale markings equals $(1n)b$, which is greater than or equal to $5na$. This means that the volume difference between successive fine scale markings equals $1a$. Finally, because "n" is an integer greater than or equal to one, the volume difference between the coarse scale markings, or $5na$, is at least five times greater than the volume difference between fine scale markings.

Preferably, the housing's volume unit "b"—corresponding to successive markings upon the coarse region of the scale—is at least fifty (50) times the housing's volume unit "a"—corresponding to successive markings in the fine region of the scale. This means that $b \geq 50a$. This means that the volume difference between coarse scale markings equals (1n)b, which is greater than or equal to 50na. This means that the volume difference between the fine scale markings equals 1a. Finally, because "n" is an integer greater than or equal to one, then the volume difference between the coarse scale markings 5na is at least fifty times greater than the volume difference between fine scale markings. This simple attainment bears repeating, as it it unrealizable by any previous pipet tips: the volume difference between the scale markings of different scales is at least 50:1.

It will be recognized by a practitioner of the mechanical arts that the above-stated preferred ratios do not represent boundaries outside of which the principles of the present invention are inapplicable, and within which the advantages of the invention are everywhere equally secured. Rather, the improvement of the present invention will be recognized to embody a fundamentally new approach to attempting to measure a great range of volumes in a single, simple, "reference" pipet tip. The preferred operational ranges and ratios are quantified not as a limitation on the principles of the present invention, but only so that the preferred embodiments of the present invention may be better, quantitatively, distinguished form their brethren of lessor capabilities.

These and other aspects and attributes of the present invention will become increasingly clear upon reference to the following drawings and accompanying specification.

DESCRIPTION OF THE PREFERRED EMBODIMENT

Figure 1:
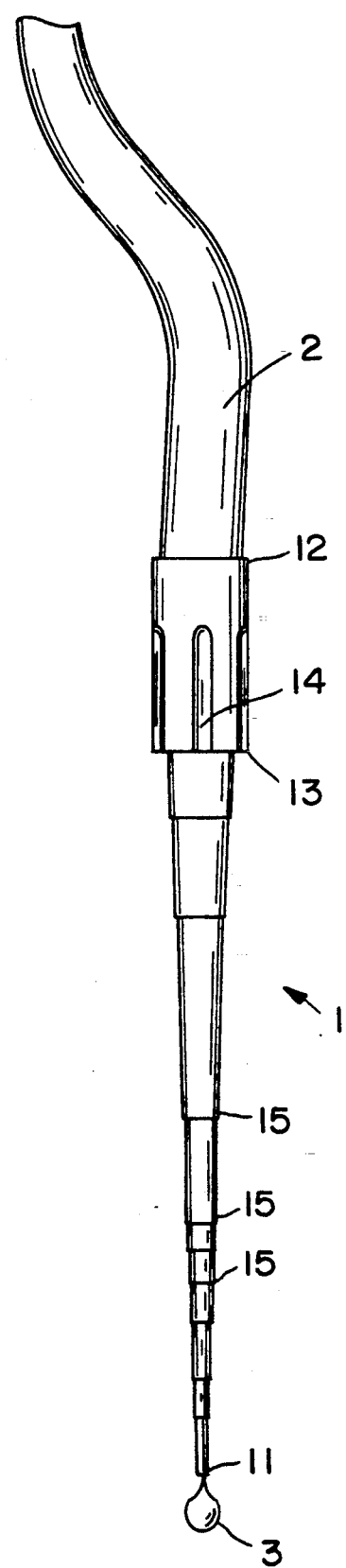
FIG. 1 is a diagrammatic perspective view showing the preferred embodiment of an improved "reference" pipet tip in accordance with the present invention in operational use.

Considering now the appearance of the improved "reference" pipet tip in accordance with the present invention in operational use, such an improved "reference" pipet tip 1 is shown connected to a portion of a pipettor 2 in FIG. 1. The pipet tip 1 is enabled to draw a droplet of fluid 3 into its interior reservoir (shown in FIG. 2), or to expel the droplet 3 from its reservoir, through it distal end tip 11 dependent upon whether its proximal end 12 is subjected to a negative pressure force (less than the pressure force on droplet 3, which is typically atmospheric pressure) or a positive pressure force. The tip 11, and the entire pipet tip 1, may, of course, be immersed in an external body of fluid (not shown) to any desired depth.

The exterior of pipet tip 1 typically presents a circumferential ridge, or shoulder, 13 and several, nominally four, axial ribs, or grooves, 14 at its proximal end region. These features aid in grasping the pipet tip 1 with the fingers of the hand (not shown), and in inserting the pipet tip 1 into, or withdrawing it from, the pipettor 2.

In accordance with the present invention, the improved "reference" pipet tip 1 presents a plurality of scale markings upon its exterior surface. These scale markings 15 are normally molded as very thin channels or grooves, as very thin and low ridges, or, preferably, as very shallow steps within the body of pipet tip 1, which is preferably made from clear medical-grade polypropylene copolymer. The scale markings 15 are sufficiently prominent so as to be readily visually locatable and identifiable, but are not so large so as to collect contamination.

Figures 2A, 2B:
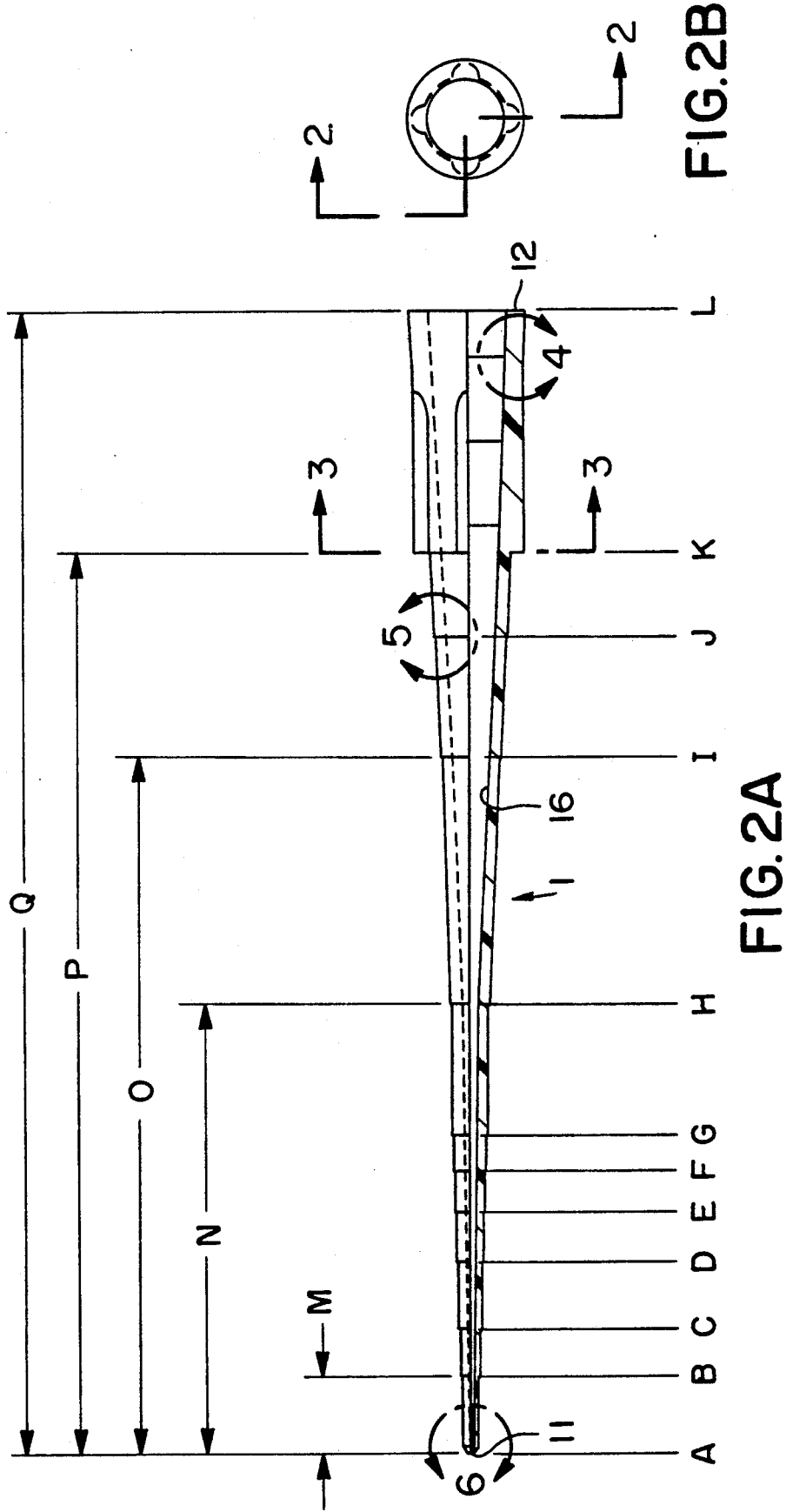
FIG. 2, consisting of FIG. 2a and FIG. 2b, is a detail cross-sectional view of the preferred embodiment of an improved "reference" pipet tip in accordance with the present invention.

An engineering drawing, interpretable in accordance with DOD-STD-100, of the improved "reference" pipet tip 1 in accordance with the present invention is shown in FIG. 2. The scale markings 15 are shown as DIN symbols A-L. Certain major distances of construction are shown as reference identification letters M-Q. These distances M-Q are respectively at the following separation from the distal end tip 11:

| reference identification | distance from distal end tip |
|---|---|
| M | .185 ± .015 inches |
| N | 1.060 ± .015 inches |
| O | 1.648 ± .015 inches |
| P | 2.127 ± .015 inches |
| Q | 2.700 ± .015 inches |

The central reservoir 16 has a first conical angle in the region from distal end tip 11 to reference identification letter N (1.060±0.015inches from tip 11) (which identification letter N is coincident in location with scale marking H), and has a second conical angle in the region between reference identification letter N and the proximal end tip 12.

Figure 3:
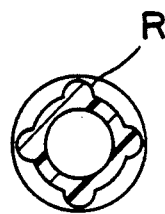
FIG. 3 is detail cross-sectional view taken along section line 3—3 shown in FIG. 2.

Various detail structure of the preferred embodiment of the improved "reference" pipet tip 1 taken at the indicated cross-sections 3-6 within FIG. 2 are shown in the respective FIGS. 3 through 6. FIG. 3 is detail cross-sectional view showing the shoulder region of pipet tip 1 taken along section line 3—3 shown in FIG. 2. Measurement R of a ridge 14 is nominally 0.030 inches full radius.

Figure 4:
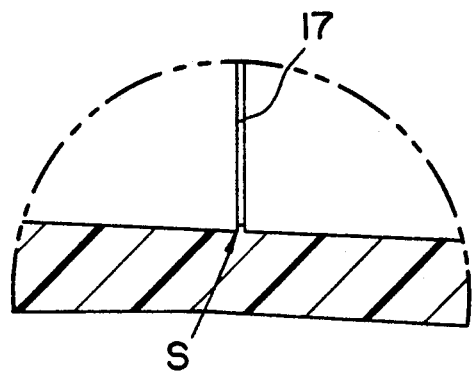
FIG. 4 is detail cross-sectional view taken along section line 4 shown in FIG. 2.

FIG. 4 is a detail cross-sectional view showing the proximal end region of the pipet tip 1, and is taken along section line 4 shown in FIG. 2. This proximal end region constricts in its central bore in order to clench the pipettor 2 (shown in FIG. 1). Measurement S, nominally 0.003 inches×0.003 inches, is of an interior holder ring 17, of which two to four such are normally employed.

Figure 5:
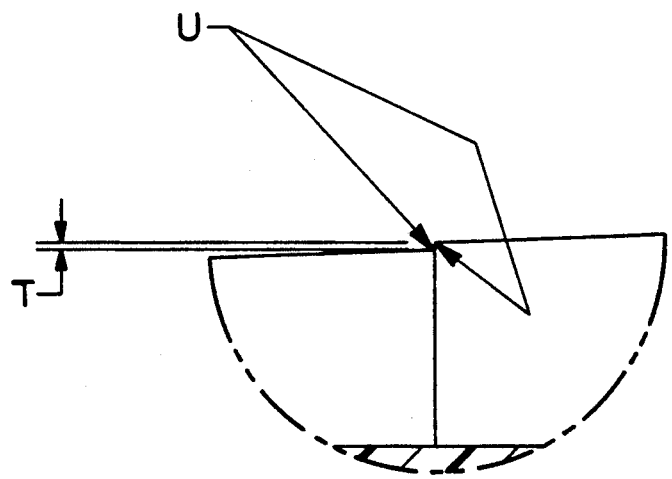
FIG. 5 is detail cross-sectional view taken along section line 5 shown in FIG. 2.

FIG. 5 is detail cross-sectional view showing the distal end to the second region of interior reservoir 16 of pipet tip 1, and is taken along section line 5 shown in FIG. 2 The dimension T is nominally 0.003+0.001−0.000 inches. The radius U is typically 0.0015±0.001 inches. The outside diameter of the section shown in FIG. 5 may be found at DIM symbol K within the table of FIG. 7.

Figures 6, 7:
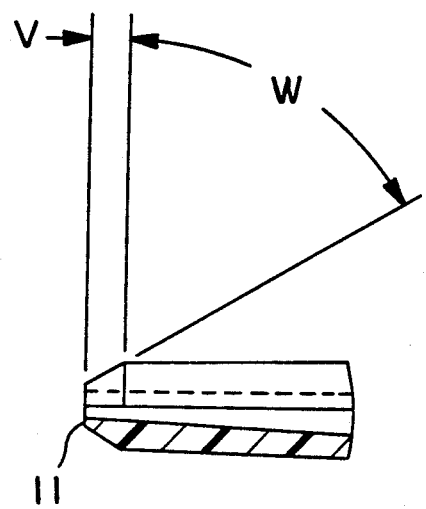
FIG. 6 is detail cross-sectional view taken along section line 6 shown in FIG. 2.
FIG. 7 is a table showing the nominal values of several dimensions referenced in the cross-sectional view of the preferred embodiment of an improved "reference" pipet tip in accordance with the present invention shown in FIG. 2.

FIG. 6 is detail cross-sectional view, taken along section line 6 shown in FIG. 2, of the tip 11 of the pipet tip 1. The dimension V is nominally 0.016+0.001−000 inches; and the angle W to which the distal end 11 is chamfered is typically 60°.

In accordance with the present invention, the distal and proximal regions of interior reservoir 16 to the pipet tip 1 are not of an equal conical angle. This is tabulated in the table titled "TABULATION BLOCK" shown within FIG. 7. The interior reservoir 16 increases in diameter at a first rate between the distal end 11 (DIM symbol A) and DIM symbol H. It thereafter increases in diameter at a different rate, reflective of a different conical angle, in the region between DIM symbol H and DIM symbol L. The lineal displacement of all the DIM symbols A-L from the reference datum, or distal end tip 11 to pipet tip 1, is listed in the Table of FIG. 7.

The construction so set forth accords that the markings 15 upon the external surface of the pipet tip 1 span a great range of volumes. In particular, the markings at each of the DIM symbols B-K correspond to the following contained fluid volumes within the interior reservoir 16 of the pipet tip 1:

| reference DIM | contained volume or reservoir 16 |
|---|---|
| B | .5 microliter |
| C | 1.0 microliters |
| D | 2.0 microliters |
| E | 3.0 microliters |
| F | 4.0 microliters |
| G | 5.0 microliters |
| H | 10.0 microliters |
| I | 50.0 microliters |
| J | 100.0 microliters |
| K | 150.0 microliters |

Measurements of contained fluid volume to any of the markings 15 may typically be made with an accuracy of ±10% Accordingly, fluid volumes from 0.5 microliters to 150 microliters are conveniently, and accurately measurable.

Certain comparisons may be made by analysis of the volume data contained within the previous paragraph and the dimensional data contained within the Table of FIG. 7. The lineal separation of the scale markings 15 one to the next varies in a ratio less than 125% (1.25:1). Moreover, the lineal separation between any pairs of the scale markings 15 vary in a ratio of less than 500% (5:1). Meanwhile, the volume contained within the interior reservoir 16 varies, between the A and B (or the B and C) pair of successive scale markings 15, and the J and K pair of successive scale markings 15, by greater than 10,000% (×100). This is the case regardless that the lineal distance between any adjacent pair of scale markings 15 is, as aforesaid, in a ratio not greater than 500% (×5).

It may also be observed how the scale markings 15 progress, one to the next and from region to region. Within the first, fine, scale region at the distal end region of the pipet tip 1 the progression of incremental volume within the reservoir 16 that occurs between successive scale markings 15 is in at least some ones of the sequence (n)a, (n+1)a, (n+2)a, (n+3)a, where n is an integer greater than or equal to one, and where a is a unit of volume. Namely a=0.5 microliter.

Within a second, proximal end, region of the pipet 1 the progression of incremental volume within the housing's reservoir that occurs between successive markings upon the scale is in at least some ones of the sequence (n)b, (2n)b, (3n)b, where n is an integer greater than or equal to one, and where b is a unit of volume. Namely, b=50 microliters.

An analysis may also be performed from the viewpoint of the volume contained.

The summary effect of the described construction is both straightforward and subtle. It is straightforward that the improved "reference" pipet tip 1 supports an improved range of scale markings, basically by its accommodation thereto which is realized in and by the special construction of its interior reservoir 16. It is more subtle that the reservoir of the improve "reference" pipet tip 1 is constructed at each of two separate gradients that are chosen so as to increase the contained volume, and so as to join precisely, in a manner making the composite external scale markings 15 optimally separated, and reasonably distributed, over the volume ranges of interest.

It is obvious that the principles of the present invention could be extended to other and/or additional scale markings than those enumerated in FIG. 7, and/or to more, and differently shaped, regions of the interior reservoir 16 than those two regions that are shown within FIG. 2, and that are specified in the Table of FIG. 7. For example, three or more regions to the interior reservoir could be employed. It is also clear that the scale markings could be on the interior, as opposed the the exterior, of the pipet tip.

In accordance with these and other possible alterations and adaptations of the present invention, the invention should be construed broadly, in accordance with the following claims, only, and not solely in accordance with that embodiment within which the invention has been taught.

I claim:

1. In a pipet tip having
    a generally conically-shaped housing with a central axis,
    the housing defining a generally conically-shaped interior reservoir,
    the housing being constructed of a material sufficiently transparent so that any liquid contents of the housing's interior reservoir may be visually observed,
    a distal, tip, end of the conical housing having means defining a generally central aperture through which liquid contents of the interior reservoir may be discharged,
    the other, proximal, end of the conical housing having means defining a generally central bore into which the end of a pipettor may be slid, and subsequently engaged, the improvement comprising:
    a visual scale on the housing, the scale having a plurality of scale markings,
    a lineal separation of the housing's visual sclae markings one to the next varying, if at all, in a ratio less than 125%,
    a lineal separation between any successive two of the housing's visual scale markings varying, if at all, in a ratio of less than 500%,
    wherein the visual scale is, if not precisely linear from one scale marking to the next, at least roughly linear, presenting successive scale markings that are at least roughly equidistantly separated in a rough linear succession;

the interior reservoir to the housing having, in an extension from the housing's distal end aperture to its proximal end bore, regions of a non-uniform, and differing, conical angle of rotation, region to region, this differing conical angle between regions making that the incremental volume of each such region with changing linear distance along the housing's axis is not the same, region to region, the differing incremental volume with linear distance along the housing's axis, being, from region to region, correlated with the visual scale markings that are upon the exterior of the housing, the correlation between the differing conical angles of the regions of the housing's reservoir, and the visual scale markings that are upon the exterior of the housing, being to the end that the volume contained within the housing's interior reservoir varies, between some one pair of successive scale markings and some other pair of successive scale markings, by greater than 2000% regardless that the lineal distance between said pairs of scale markings is, as aforesaid, in a ratio not greater than 500%.

2. The improvement to a pipet tip according to claim 1 wherein the housing's visual scale comprises;

a first, fine, scale region wherein the progression of incremental volume within the housing's reservoir occurring between successive markings upon the scale is in at least some ones of the sequence (n)a, (N+1)a, (n+2)a, (n+3)a, where 'n' is an integer greater than or equal to one, and where 'a' is a unit of volume; and a second, coarse, region wherein the progression of incremental volume within the housing's reservoir occurring between successive markings upon the scale is in at least some ones of the sequence (n)b, (2n)b, (3n)b, where 'n' is an integer greater than or equal to one, and where 'b' is a unit of volume.

3. The improvement to a pipet tip according to claim 2 wherein the housing's volume unit 'b' corresponding to successive markings upon the coarse region of the scale is at least five times the housing's volume unit a corresponding to successive markings in the fine region of the scale;

thereby $b \geq 5a$;

thereby the volume difference between coarse scale markings equals (1n)b, which is greater than or equal to 5na;

thereby the volume difference between the fine scale markings equals 1a;

thereby because 'n' is an integer greater than or equal to one, then the volume difference between the coarse scale markings 5na is at least five times greater than the volume difference between fine scale markings.

4. The improvement to a pipet tip according to claim 2 wherein the housing's volume unit 'b' corresponding to successive markings upon the coarse region of the scale is at least fifty times the housing's volume unit 'a' corresponding to successive markings in the fine region of the scale;

thereby $b \geq 50a$;

thereby the volume difference between coarse scale markings equals (1n)b, which is greater than or equal to 50na;

thereby the volume difference between the fine scale markings equals 1a;

thereby because 'n' is an integer greater than or equal to one, then the volume difference between the coarse scale markings 5na is at least fifty times greater than the volume difference between fine scale markings.

5. In a pipet tip having a generally conically-shaped housing with a central axis, the housing defining a generally conically-shaped interior reservoir, the housing being constructed of a material sufficiently transparent so that any liquid contents of the housing's interior reservoir may be visually observed, a distal, tip, end of the conical housing having means defining a generally central aperture through which liquid contents of the interior reservoir may be discharged, the other, proximal, end of the conical housing having means defining a generally central bore into which the end of a pipettor may be slid, and subsequently frictionally engaged, the improvement comprising:

a visual scale on the housing, the scale having a plurality of scale markings within each of at least two, a fine and a coarse, regions, a lineal separation of the housing's visual scale markings one to the next within each of the two regions being in a ratio less than 125%, a lineal separation between any two of the housing's visual scale markings within a single region being in a ratio of less than 220%, a lineal separation between any two successive scale markings of a one region and any two successive scale markings of the other region being in a ratio of less than 500%, wherein the visual scale is, in both regions of the scale, if not precisely linear at least roughly linear, with successive scale markings within each region that are at least in a rough linear succession;

the interior reservoir to the housing having, from the housing's distal end aperture to its proximal end bore, regions of a non-uniform, and differing, conical angle of rotation, this differing conical angle between regions making that the incremental volume of each such region with linear distance along the axis of the housing's reservoir is not the same region to region, the differing incremental volume with linear distance along the axis of the housing being, from region to region, correlated with the visual scale markings upon the exterior of the housing to the end that the volume contained within the housing's interior reservoir should vary, between and one pair of successive scale markings and any other pair of successive scale markings, by greater than 2000% regardless that the lineal distance between said pairs of scale markings is, as aforesaid, in a ratio not greater than 500%.

* * * * *